US012749936B2

(12) United States Patent
Glückler et al.

(10) Patent No.: US 12,749,936 B2
(45) Date of Patent: Sep. 29, 2026

(54) ROTOR ARRANGEMENT FOR IMPROVED COOLING OF A ROTOR

(71) Applicant: ZF Friedrichshafen AG, Friedrichshafen (DE)

(72) Inventors: Johannes Glückler, Friedrichshafen (DE); Bernard Hunold, Friedrichshafen (DE); Alexander Thorwart, Langenargen (DE); Alexander Bäumle, Hamburg (DE); Michael Preuß, Friedrichshafen (DE); Niclas Raeder, Bermatingen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 114 days.

(21) Appl. No.: 18/659,220

(22) Filed: May 9, 2024

(65) Prior Publication Data

US 2024/0380266 A1 Nov. 14, 2024

(30) Foreign Application Priority Data

May 12, 2023 (DE) ..................... 10 2023 204 449.8

(51) Int. Cl.

| | |
|---|---|
| ***H02K 1/32*** | (2006.01) |
| ***H02K 1/276*** | (2022.01) |
| ***H02K 9/19*** | (2006.01) |
| *H02K 29/03* | (2006.01) |

(52) U.S. Cl.

CPC ............... *H02K 1/32* (2013.01); *H02K 1/276* (2013.01); *H02K 9/19* (2013.01); *H02K 29/03* (2013.01)

(58) Field of Classification Search

CPC ........ H02K 1/32; H02K 1/276; H02K 1/2766; H02K 9/19; H02K 29/03; H02K 2201/06

See application file for complete search history.

(56) References Cited

U.S. PATENT DOCUMENTS

| | | | | |
|---|---|---|---|---|
| 9,041,261 | B2 | 5/2015 | Yamamoto et al. | |
| 9,847,682 | B2 | 12/2017 | Takahashi | |
| 12,113,400 | B2 | 10/2024 | Matsuzaki | |
| 2020/0274410 | A1* | 8/2020 | Yao | H02K 1/32 |
| 2023/0068403 | A1* | 3/2023 | Matsuzaki | H02K 1/32 |
| 2023/0336040 | A1* | 10/2023 | Goto | H02K 9/19 |
| 2023/0412019 | A1* | 12/2023 | Makino | H02K 1/32 |
| 2025/0226712 | A1* | 7/2025 | Matsuda | H02K 1/30 |

FOREIGN PATENT DOCUMENTS

| | | | |
|---|---|---|---|
| DE | 10 2019 120 787 | 2/2021 | |
| JP | 2007-174755 | 7/2007 | |
| WO | WO-2021018343 A1 * | 2/2021 | H02K 9/19 |
| WO | WO2022096283 A1 | 5/2022 | |

OTHER PUBLICATIONS

WO-2021018343-A1 Machine Translation (Year: 2021).*

* cited by examiner

*Primary Examiner* — Oluseye Iwarere
*Assistant Examiner* — Masoud Vaziri
(74) *Attorney, Agent, or Firm* — Secant IP, PLLC

(57) ABSTRACT

The invention relates to a rotor arrangement (100, 100*a*) for the improved cooling of a rotor. The arrangement includes a rotor core (9) and a rotor shaft (17) with an axial rotor axis (14), where the rotor core (9) is arranged on the rotor shaft (17). The rotor core (9) is defined by rotor laminae stacked one after another, and the rotor core (9) comprises at least embedded outer magnets (11), the outer magnets (11) being arranged radially outside in the rotor core (9) in axially extending magnet pockets (34).

19 Claims, 8 Drawing Sheets

ROTOR ARRANGEMENT FOR IMPROVED COOLING OF A ROTOR

RELATED APPLICATIONS

This application claims the benefit of and right of priority under 35 U.S.C. § 119 to German Patent Application no. 10 2023 204 449.8, filed on 12 May 2023, the contents of which are incorporated herein by reference in its entirety.

FIELD OF THE DISCLOSURE

The invention relates to a rotor arrangement for the improved cooling of a rotor, comprising a rotor core and a rotor shaft with an axial rotor axis, wherein the rotor core is arranged on the rotor shaft, wherein the rotor core is defined by rotor laminae stacked one behind another, and wherein the rotor core comprises at least embedded outer magnets, the outer magnets being arranged radially outside in the rotor core in axially extending magnet pockets.

BACKGROUND

A motor with a stator and a rotor for use in an electrically driven vehicle, such as a fully electric automobile or a hybrid automobile, is operated at a high rotation speed.

Such a rotor comprises a rotor core which consists of a stack of electromagnetic steel laminae. Magnets are embedded in the rotor core.

With increasing power density, greater demands are also made on the cooling of the electric machine.

SUMMARY

It is therefore a purpose of the present invention to indicate an improved rotor arrangement for cooling a rotor.

This objective is achieved by a rotor arrangement as variously disclosed herein.

Further advantageous features are disclosed, which can be combined suitably with one another in order to achieve further advantages.

The objective is achieved by a rotor arrangement for the improved cooling of a rotor, comprising a rotor core and a rotor shaft with an axial rotor axis, wherein the rotor core is arranged on the rotor shaft, wherein the rotor core is defined by rotor laminae stacked one behind another, and wherein the rotor core comprises at least embedded outer magnets, the outer magnets being arranged radially outside in the rotor core in axially extending magnet pockets,

- wherein the rotor core is formed of four, or a larger even number of rotor segments arranged one behind another,
- wherein at least the first rotor segment and also the second rotor segment are stacked directly one after the other to form a first rotor section, wherein in the area of the outer magnets the first rotor segment comprises respective axially through-going first flux barriers separate from the outer magnets and wherein in the area of the outer magnets the second rotor segment comprises respective axially through-going second flux barriers separate from the outer magnets, wherein the first rotor segment and the second rotor segment are offset at an angle to one another, wherein the angular offset is formed such that the first flux barriers and the second flux barriers overlap partially in a first overlap zone,
- wherein at least the third rotor segment and also the fourth rotor segment are stacked directly one after the other to form a second rotor section, wherein in the area of the outer magnets the fourth rotor segment comprises respective axially through-going fourth flux barriers separate from the outer magnets and wherein the third rotor segment comprises respective axially through-going third flux barriers separate from the outer magnets, wherein the third rotor segment and the fourth rotor segment are offset at an angle to one another, wherein the angular offset is formed such that the third flux barriers and the fourth flux barriers overlap partially in a second overlap zone, and wherein between and adjacent to the first rotor section and the second rotor section an intermediate disk is arranged around the rotor shaft, wherein the intermediate disk comprises, distributed around its circumference, radially extending first fluid-guiding ducts and second fluid-guiding ducts for guiding cooling fluid, and wherein by way of the rotor shaft cooling fluid can be passed into the intermediate disk, wherein the first fluid-guiding ducts have first outlets at their radially outer ends and the second fluid-guiding ducts have second outlets at their radially outer ends to allow an outflow of the cooling fluid, wherein the first outlets are connected fluidically with the adjacent flux barriers of the first rotor section and the second outlets are connected fluidically with the adjacent flux barriers of the second rotor section to allow an inflow of cooling fluid into the corresponding flux barriers, so that by virtue of the first overlap a through-going axial cooling of the outer magnets of the first rotor section with cooling fluid and by virtue of the second overlap a through-going axial cooling of the outer magnets of the second rotor section with cooling fluid takes place.

Terms which contain ordinate numbers such as first and second can be used to describe various components, but the components are not limited by the terms. The terms are only used to distinguish between one component and another.

In particular, the first, second, third, and fourth flux barriers are designed identically and arranged at the same radial level.

In particular, the first and second rotor sections and also the individual rotor segments have the same axial length.

For example, if the rotor comprises six rotor segments, then the intermediate disk is arranged between the first three and the last three rotor segments, i.e., half-way along; the same applies in the case of a larger even number of rotor segments.

Outer magnets can include a row of outer magnets.

The magnets can in particular be arranged in a V-shape or U-shape, and as magnets arranged in a V-shape or U-shape they can be distributed uniformly around the circumference in such manner that the V or U is open radially toward the outside.

The outer magnets can be arranged in the outer periphery of the rotor core. In this case the magnets can be arranged in magnet pockets which each have an end pocket.

Likewise, there can be inner magnets with a U-shape or V-shape. Besides the inner magnets and the outer magnets, there can also be middle magnets. Other designs are also possible.

The flux barriers can also all be arranged at the end of the outer magnets in the outer periphery of the rotor core. The flux barriers are separate from the magnets and also the magnet pockets.

The flux barriers can in particular be arranged as recesses in the rotor core.

According to the invention, it was recognized that in the continuous power limit area the outermost magnets of the rotor of an electric machine are the most severely loaded.

Thanks to the invention, in a simple manner cooling fluid, in particular oil, can now be delivered to the outer magnets to cool them.

This cooling fluid is conveyed through the flux barriers, which are designed such that despite the rotation of the rotor segments they each have an overlap zone. The rotation of the rotor segments reduces the torque ripple of an electric machine with a rotor and a stator. Furthermore, this contributes to a homogenization of the motor torque.

By virtue of the first overlap zone the cooling fluid can flow unimpeded close to the outer magnets through the first rotor section, which includes the first and second rotor segments, and can therefore carry heat away from the outer magnets.

By virtue of the second overlap zone, the cooling fluid can flow unimpeded close to the outer magnets through the second rotor section, which includes the third and fourth rotor segments, and can therefore carry heat away from the outer magnets.

Thus, despite the rotation of the rotor segments to prevent torque ripple, the most severely loaded outer magnets are sufficiently well cooled. In that way rapid and effective cooling is made possible. In particular the angular offset between the first rotor segment and the second rotor segment is identical to that between the third rotor segment and the fourth rotor segment, so that in that respect the intermediate disk defines a mirror axis.

Flux barriers can also be arranged with existing inner or middle magnets, and outlets can be provided from the fluid-guiding ducts to them. In that case, the respective flux barriers must also have a corresponding overlap in order to be able to guide the cooling fluid through the whole of the first and second sections.

In a further embodiment the first overlap and also the second overlap are arranged in the outer periphery in the respective flux barriers in the area of a radially outer side of the rotor core.

Furthermore therefore, the flux barriers and the overlap zones are designed such that they cover the outer corners of the magnets, which are close to an air gap between a rotor and a stator, i.e., close to the radial outside of the rotor core. Besides the direct cooling of the outer magnets, this also reduces the magnetic field strength at these points which are critical for the demagnetization security. This provides an additional potential for reducing the rare-earth element content of the outer magnets.

In a further embodiment the intermediate disk comprises a distributor ring which is fluidically connected to the first fluid-guiding ducts and the second fluid-guiding ducts, in order to distribute the cooling fluid by way of the distributor ring to the first and second fluid guiding ducts.

The fluid, which for example is injected into the rotor shaft, flows radially outward due to centrifugal force and, for example, flows through rotor shaft openings, again due to centrifugal force, into the distributor ring. From there, it is distributed uniformly and then flows into the fluid-guiding ducts and, from there, through the outlets in the flux barriers to cool the outer magnets.

In this case the distributor ring is in particular arranged directly on the rotor shaft outside of the rotor shaft. Alternatively, such a distributor ring can also be formed radially on the end side of the intermediate disk.

In a further embodiment, the intermediate disk is made of a first disk element and a second disk element identical to the first, such that the first disk element has fluid-guiding ducts arranged around its circumference and the second disk element has identical fluid-guiding ducts, and such that the first and second disk elements are arranged relative to one another to form the intermediate disk in such manner that in the first disk element first fluid-guiding ducts with the first outlets and in the second disk element second fluid-guiding ducts with second outlets are formed.

By virtue of such a design, production can take place in an extremely simplified manner, namely, with the same tool and therefore inexpensively.

Furthermore, in a preferred design, the first and second disk elements are welded to one another in such manner that the fluid-guiding ducts are all formed inside the intermediate disk.

In a further embodiment, both the first and the second disk element are made of plastic, wherein one of the two disk elements is made of a transparent plastic and wherein the two disk elements are welded to one another by plastic welding along the fluid-guiding ducts.

Thanks to the transparent disk element, a laser arranged above the transparent disk element can recognize, for example, the contours of the fluid-guiding ducts, and welding along the fluid-guiding ducts can be carried out in a simple manner.

Thus, the disk element under the transparent disk element is melted and is thereby joined to the disk element above it. To bring about the melting of the lower disk element first, the two disk elements can be made from different weldable plastics.

Moreover, by virtue of such a transparent disk element simple quality control can be carried out, since for example it can be seen whether one of the fluid-guiding ducts has unintentionally been welded shut.

By virtue of such welding of the disk elements the intermediate disk can be made leakproof.

Alternatively, the first and second disk elements can be adhesively bonded to one another.

In a further embodiment a plurality of ring segment recesses may be present in the intermediate disk, which are each in fluidic connection with the corresponding first fluid-guiding ducts and with the corresponding second fluid-guiding ducts, in order to distribute the cooling fluid via the ring segment recesses to the first and second fluid-guiding ducts. The ring segment recesses of the plurality of ring segment recesses are identically designed and are formed symmetrically in the intermediate disk on the rotor shaft. Such annular recesses enable simple fluid guiding.

In a further embodiment, the first fluid-guiding ducts and the second fluid-guiding ducts are made as recesses in the intermediate disk. In that way fluid-guiding ducts can be produced through the intermediate disk in a simple manner.

Moreover, in another embodiment, the intermediate disk can be made in one piece. By virtue of such an integral structure with the recesses the intermediate disk can be made very thin.

Furthermore, the intermediate disk has at least one projection, and the rotor shaft has a corresponding recess such that the at least one projection fits into the corresponding recess so as to center the intermediate disk on the rotor shaft. This enables simple assembly and fixing.

Moreover, in a further embodiment the first fluid-guiding ducts and the second fluid-guiding ducts have constrictions for controlling the through-flowing cooling fluid. The constrictions in this case define an aperture geometry for an adjustable volume flow.

In a further embodiment the rotor shaft has rotor shaft openings distributed around its circumference, which open onto the distributor ring or the ring segment recesses. In particular several rotor shaft openings can be provided, each connected fluidically with the distributor ring or the ring segment recesses and distributed, in particular equidistantly, around the circumference of the rotor shaft. In particular, the rotor shaft openings can be in the form of bores. This enables cooling fluid to be supplied from the rotor shaft.

In a further embodiment the rotor shaft has an all-round catch groove facing toward the rotor axis, with the rotor shaft openings inside the catch groove. Thus, the cooling fluid flowing along an inside of the rotor shaft is captured and, by virtue of centrifugal force, passed into the catch groove and thence to the rotor shaft openings.

In another embodiment, the rotor shaft has a rotor shaft inside and an all-round dam which is arranged on the inside of the rotor shaft facing toward the rotor axis, the dam being arranged next to the rotor shaft openings in such manner that cooling fluid flowing along the inside of the rotor shaft flows into the rotor shaft openings. The dam is arranged only on one side of the rotor shaft openings, so that cooling fluid flowing along the opposite side accumulates and flows into the rotor shaft openings. The dam is positioned on the side of the rotor shaft where no cooling fluid is flowing.

In a further embodiment, an all-round collecting channel is arranged on at least at one of the front-end rotor segments, the collecting channel being open toward the rotor axis so as to capture any cooling fluid that sprays away from a fluid inlet arranged a distance away from the corresponding front end. Thus, the collecting channel co-rotates. The collecting channel can collect cooling fluid flowing away from a fluid inlet as if in the manner of a kind of gutter. Such a fluid inlet can for example be a duct or tube which is arranged in the housing of the electric machine in which the rotor and the stator are also arranged. The fluid inlet can, for example, inject the fluid, in this case oil, into the collecting channel by means of pump pressure.

From there the oil can pass between the outside of the rotor shaft and the rotor core to the intermediate disk.

Furthermore, in a further embodiment the rotor shaft can have a rotor shaft outside and the outside of the rotor shaft can have longitudinal grooves around the circumference, which extend at least from the collecting channel to the intermediate disk in order to pass the captured cooling fluid from the annular collecting channel to the intermediate disk. In particular however, for the sake of symmetry the longitudinal grooves extend over the whole of the rotor shaft outside. In that way the cooling fluid can pass from the collecting channel between the rotor core and the outside of the rotor shaft to the intermediate disk in a targeted manner.

In another embodiment, the rotor core has recess groves which extend at least from the collecting channel to the intermediate disk to guide the captured cooling fluid from the annular collecting channel to the intermediate disk.

In particular, for the sake of symmetry both of the rotor sections have recess grooves. In that way, the cooling fluid can be passed in a targeted manner from the collecting channel between the rotor core and the outside of the rotor shaft to the rotor shaft openings. Through holes, the cooling oil can pass from the axial recess grooves and/or longitudinal grooves into the distributor ring or the ring segment recesses.

In a further embodiment, baffles can be provided, which are arranged in the first and second fluid-guiding ducts for the controlled adjustment of the cooling fluid flowing through. By virtue of the baffles a controlled adjustment can be carried out, for example in the form of a throttling of the quantity of fluid, in this case oil.

In a further embodiment, the intermediate disk is bonded to the first rotor section and the second rotor section. For reasons of rotational symmetry, the intermediate disk has the same radial dimensions as the rotor sections. Adhesive bonding produces a simple connection between the rotor sections and the intermediate disk.

BRIEF DESCRIPTION OF THE DRAWINGS

Further properties and advantages of the present invention emerge from the following description, which refers to the attached figures which show, in a schematic manner.

DETAILED DESCRIPTION

Figure 1:
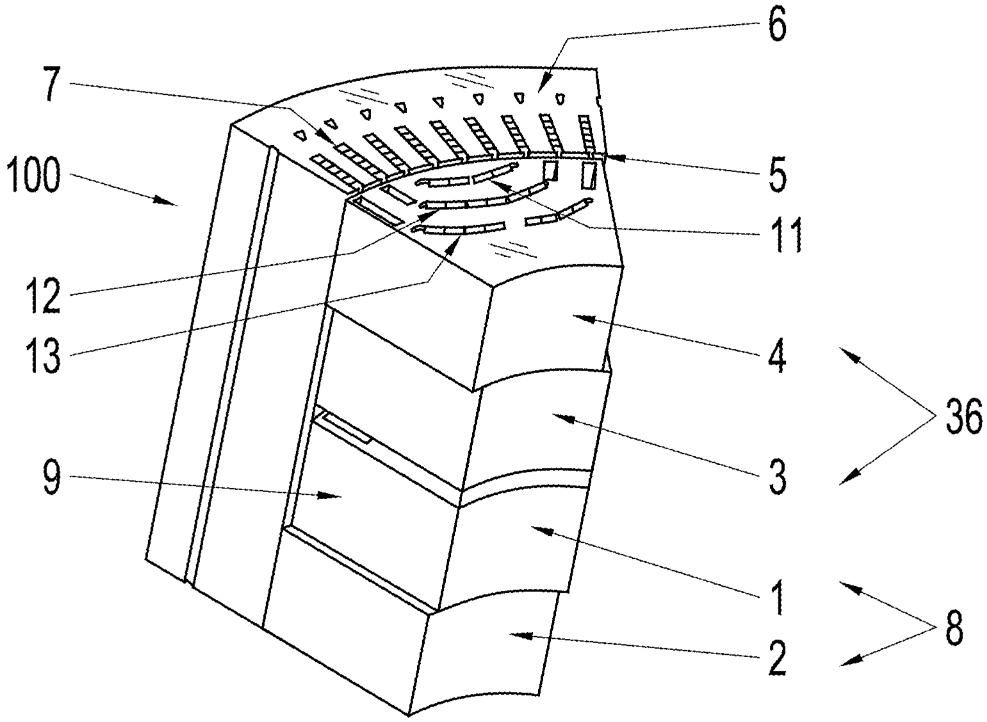
FIG. 1: A rotor arrangement according to the invention.

FIG. 1 shows a rotor arrangement 100 according to the invention. In this case, the rotor arrangement 100 comprises a rotor core 9 which is formed of laminae stacked one after the other. Furthermore, a rotor shaft 17 (FIG. 2), also called the rotor carrier is provided, which supports the rotor core 9. Radially around the rotating rotor core 9 a stator 6 is fitted, which with the rotor core 9 forms an air gap 5. The stator 6 can have windings 7 in so-termed stator grooves. The rotor 9 has a first rotor segment 1 and a second rotor segment 2. The first rotor segment 1 and the second rotor segment 2 form a first rotor section 8.

In addition, a third rotor segment 3 and a fourth rotor segment 4 are provided, which form a second rotor section 36. The rotor segments 1, 2, 3 and 4 can have the same radial and axial length. Moreover, an intermediate disk 10 (FIG. 3) is provided, which is arranged between the first rotor segment 1 and the third rotor segment 3, in particular bonded to them. The intermediate disk 10 has the same radial length.

The first rotor segment 1 and the second rotor segment 2 are offset by an angle relative to one another. Likewise, the third rotor segment 3 and the fourth rotor segment 4 are offset relative to one another. In particular the two rotor sections 8 and 36 have the same angular offset, in this case for example 2.5 degrees. Thus, the first rotor segment 1 and the second rotor segment 2 are offset relative to one another by the same amount as the third rotor segment 3 and the fourth rotor segment 4.

Figure 2:
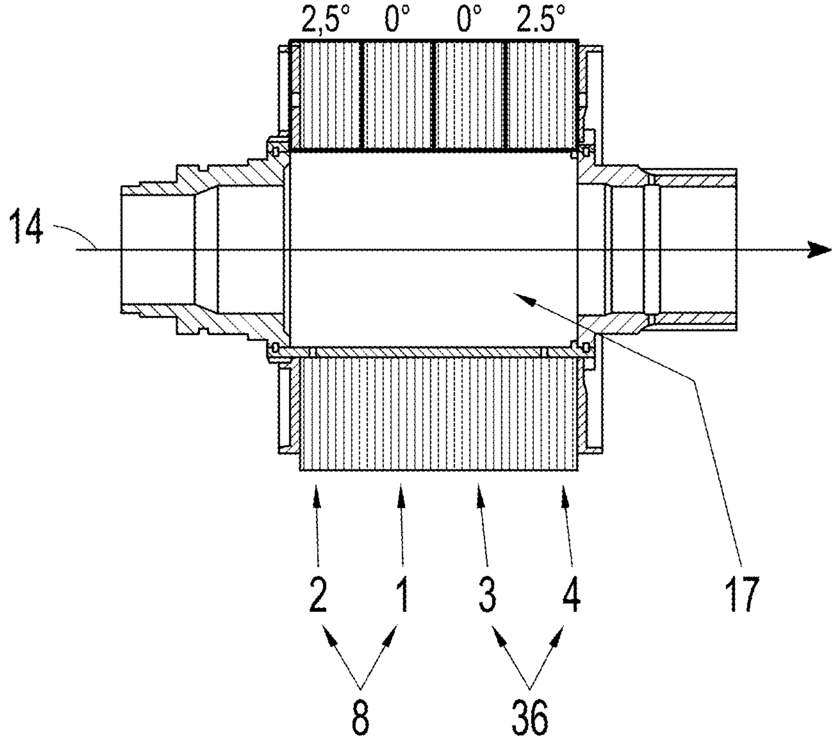
FIG. 2: Such a rotation of rotor segments.

FIG. 2 shows such an offset in detail. The offset of the two outer rotor segments, namely the rotor segments 2 and 4, amounts to 2.5 degrees. The slight symmetrical offset of the rotor segments 1, 2, 3 and 4 is a means for reducing the torque ripple of the electric machine.

Figure 4:
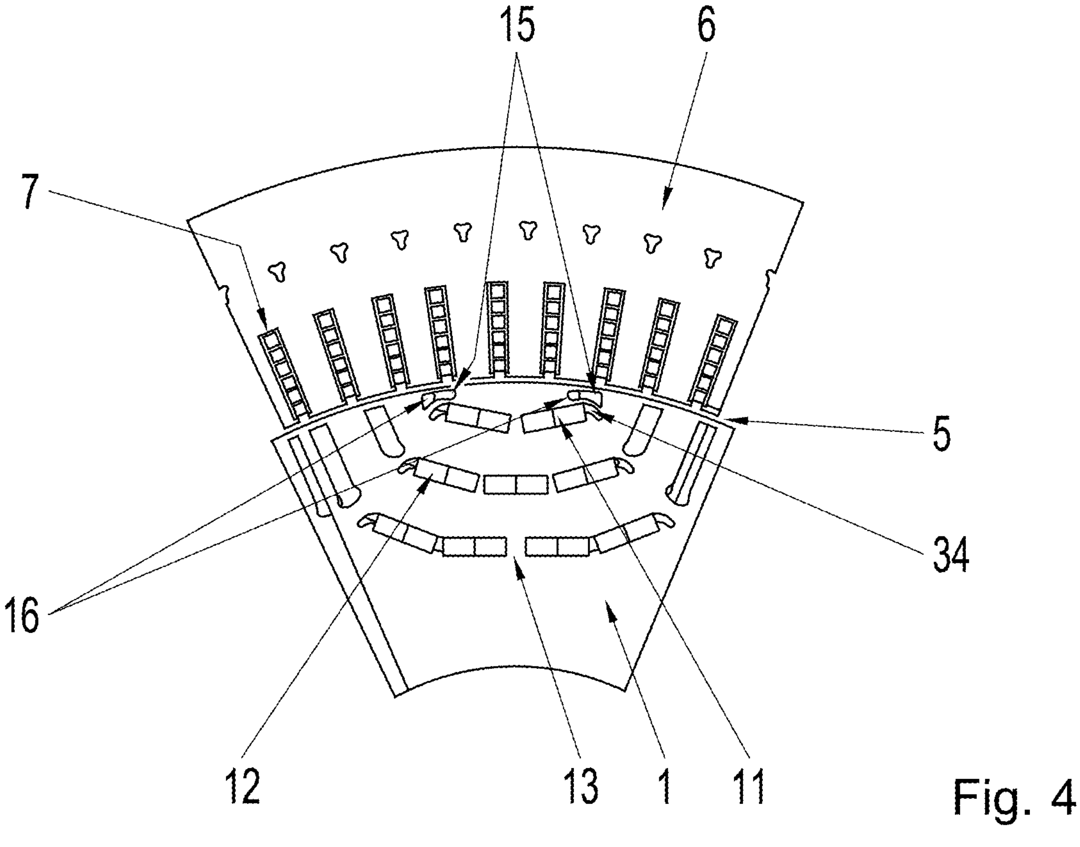
FIG. 4: Flux barriers, shown schematically.

Furthermore FIGS. 1 and 4 show the outer magnets 11, which are arranged at the outer edge in a U-shape and which extend axially in the rotor segments 1, 2, 3, 4 in magnet pockets 34 (FIG. 4), the middle magnets 12, which are arranged in a U-shape in the middle and extend axially in the rotor segments 1, 2, 3, 4, and inner magnets 13 facing toward a rotor axis 14 (FIG. 2), which are again arranged in a U-shape and extend axially in the rotor segments 1, 2, 3, 4. In this case such magnets 11, 12, 13 arranged in a U-shape are distributed as necessary within the individual rotor segments 1, 2, 3, 4. The inner magnets 11, the middle magnets 12 and the outer magnets 13 are arranged in U-shapes one behind another. In addition, the intermediate disk 1 is arranged between the first rotor section 8 and the second rotor section 36.

Figure 3:
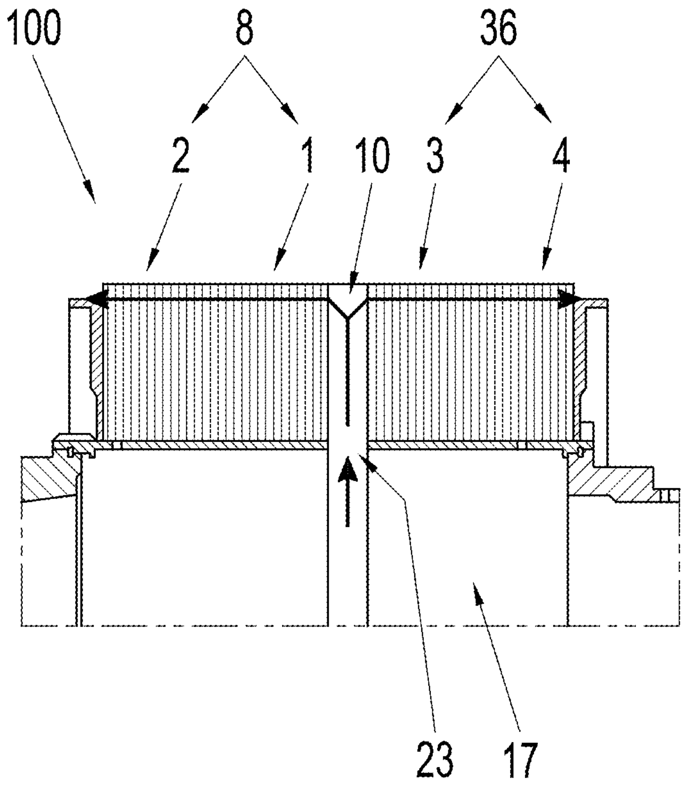
FIG. 3: The arrangement of the intermediate disk.

FIG. 3 shows schematically the arrangement of the intermediate disk 10. The intermediate disk 10 is designed to guide and distribute oil, and is arranged on the rotor shaft 17 between the first rotor section 8 and the second rotor section 36.

Furthermore, the rotor segments 1, 2, 3 and 4 comprise outer flux barriers which are in the form of recesses or ducts.

FIG. 4 shows such flux barriers 15 schematically, in the first rotor segment 1.

In this case, in the first rotor segment 1 there are first flux barriers 15 and in the second rotor segment 2 there are second flux barriers, which extend axially through the first rotor section 8. Analogously to the first flux barriers 15 and the second flux barriers, the third flux barriers and the fourth flux barriers are arranged close to the air gap 5, respectively at the ends of the outer magnets 11.

The first, second, third and fourth flux barriers are identically designed and arranged at the same radial level.

In this case the first flux barriers 15 and the second flux barriers are designed such that even with the offset of the rotor segments 1 and 2, i.e., with the angular offset of 2.5 degrees, they have a first overlap zone 16. Moreover, the third and fourth flux barriers are designed such that even with the offset of the rotor segments 3 and 4, i.e., with the angular offset of 2.5 degrees, they have a second overlap zone.

The flux barriers and the overlap zones are respectively of identical design.

The oil passing through the intermediate disk 10 can thus be guided into the flux barriers. This cooling fluid is passed through the flux barriers, which are designed such that despite the rotation of the rotor segments 1, 2, 3, and 4 they have the first overlap zone 16 and the second overlap zone. Such a rotation of the rotor segments 1, 2, 3, and 4 brings about a reduction of the torque ripple of an electric machine with a rotor and a stator. Moreover, it contributes toward a homogenization of the motor torque.

Furthermore, the flux barriers are designed such that they cover the outer corners of the magnets 11, which are close to the air gap 5. Besides the direct cooling of the outer magnets 11 this also reduces the magnetic field strength at the latter for the demagnetization reliability at critical points. This provides an additional potential for reducing the rare-earth content of the magnets 11.

In this case, the flux barriers are essentially recesses.

In this way, the outer magnets 11, which are most severely loaded in the continuous power limit area in an electric machine, are relieved.

By virtue of the first overlap zone 16, the cooling fluid can flow unimpeded in the vicinity of the outer magnets 11 through the first rotor section 8, which comprises the first rotor segment 1 and the second rotor segment 2, and can in that way carry away heat from the outer magnets 11.

By virtue of the second overlap zone, the cooling fluid can flow unimpeded in the vicinity of the outer magnets 11 through the second rotor section 36 which comprises the third rotor segment 3 and the fourth rotor segment 4, and can in that way carry away heat from the outer magnets 11.

Thus, despite the rotation of the rotor segments 1, 2, 3, 4 for preventing the torque ripple, the most severely loaded outer magnets 11 can be cooled sufficiently. Thereby, quick and effective cooling is possible.

To discharge and to guide the cooling fluid, the intermediate disk 10 comprises first fluid-guiding ducts 18 and second fluid-guiding ducts 19.

Figure 5:
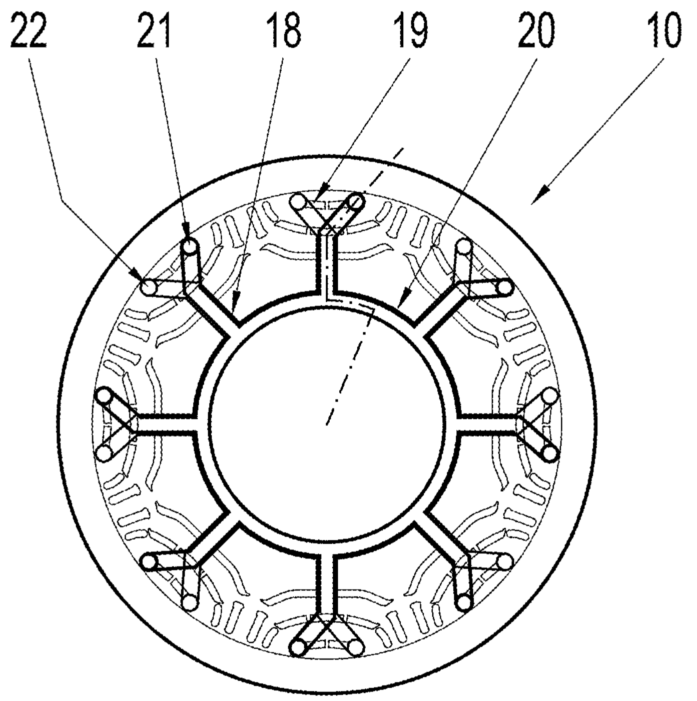
FIG. 5: An intermediate disk, in detail.
Figure 7:
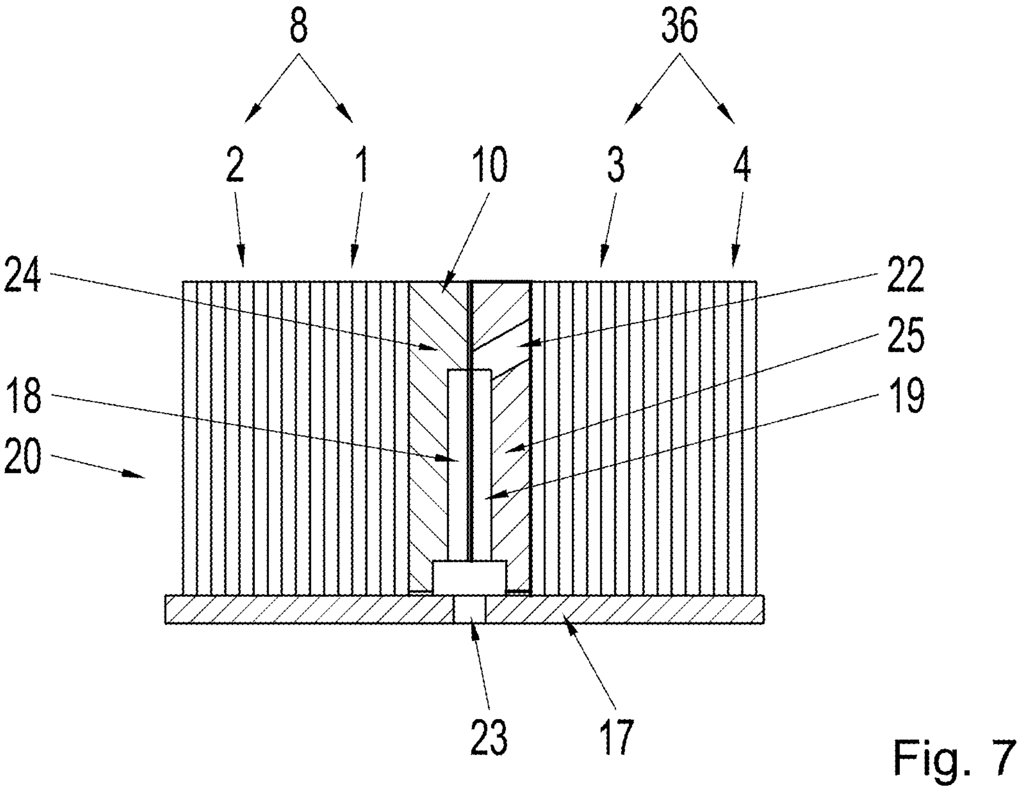
FIG. 7: Such an intermediate disk, in detail as fitted.

FIG. 5 shows the intermediate disk 10 in detail. This comprises a distributor ring 20 which is arranged on the rotor shaft 17 and is fluidically connected for example to rotor shaft openings 23 (FIG. 7). In that case, the rotor shaft openings 23 are formed around the circumference of the rotor shaft 17, for example in the form of bores. The distributor ring 20 distributes the oil flowing in through the rotor shaft openings 23 uniformly around the circumference.

In addition, first fluid-guiding ducts 18 and second fluid-guiding ducts 19 are formed, for example opposite one another, with first outlets 21 which are connected fluidically, in particular aligned with the first flux barriers 15, and with second outlets 22 which are connected fluidically, in particular aligned with the third flux barriers.

In this example, the fluid-guiding ducts 18, 19 have a curvature. The fluid-guiding ducts can also for example extend straight from the outlets 21, 22 to the distributor ring 20. In that case, the first disk element 24 and also the second disk element 25 are in particular made of plastic, and can be welded to one another.

Figure 6:
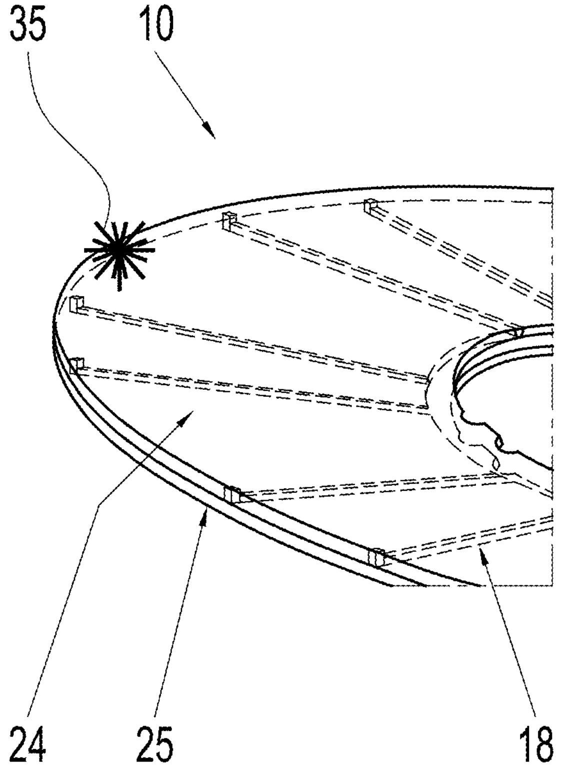
FIG. 6: Welding of the disk elements, shown schematically.

FIG. 6 shows schematically such welding of the disk elements 24, 25.

In this case the disk element 24 (or the disk element 25) is made transparent so that a plastic weld along the fluid-guiding ducts 18, 19 is made possible. Thanks to the transparent disk element 24, a laser 35 arranged above the transparent disk element 24 can, for example, recognize the contours of the fluid-guiding ducts 18, 19 and produce a weld joint along the fluid-guiding ducts 18, 19 in a simple manner.

Thus, the disk element 25 under the transparent disk element 24 is melted and thereby is joined to the disk element 24 above it.

To ensure the melting of the lower disk element 25 first, the disk elements 24, 25 can be made from different weldable plastics.

Moreover, by virtue of such a transparent disk element 24, simple quality control can be carried out. For example, it can be seen whether one of the fluid-guiding ducts 18, 19 has been unintentionally welded shut. By such welding the intermediate disk 10 can be fluidically produced. Thanks to such a structure, the production can be made extremely simple, namely, each disk element 24, 25 can be produced with the same tool and therefore inexpensively. By virtue of such welding, the oil interfaces or oil transfer points can be sealed simply.

By virtue of such welding, the two disk elements 24, 25 are welded together in a mirror-image configuration.

Alternatively, the two disk elements 24, 25 can be adhesively bonded.

By virtue of such an intermediate disk 10 the oil injected into a rotor shaft 17 can be captured and passed on to the outer magnets 11.

FIG. 7 shows such an intermediate disk 10 in detail, as fitted. The intermediate disk 10 consists of a first disk element 24 and an identical second disk element 25, however, the intermediate disk 10*a* can also be made integrally. The first disk element 24 comprises the first fluid-guiding ducts 18 with the first outlets 21, and the second disk element 25 comprises the second fluid-guiding ducts 19 with second outlets 22.

Figure 8:
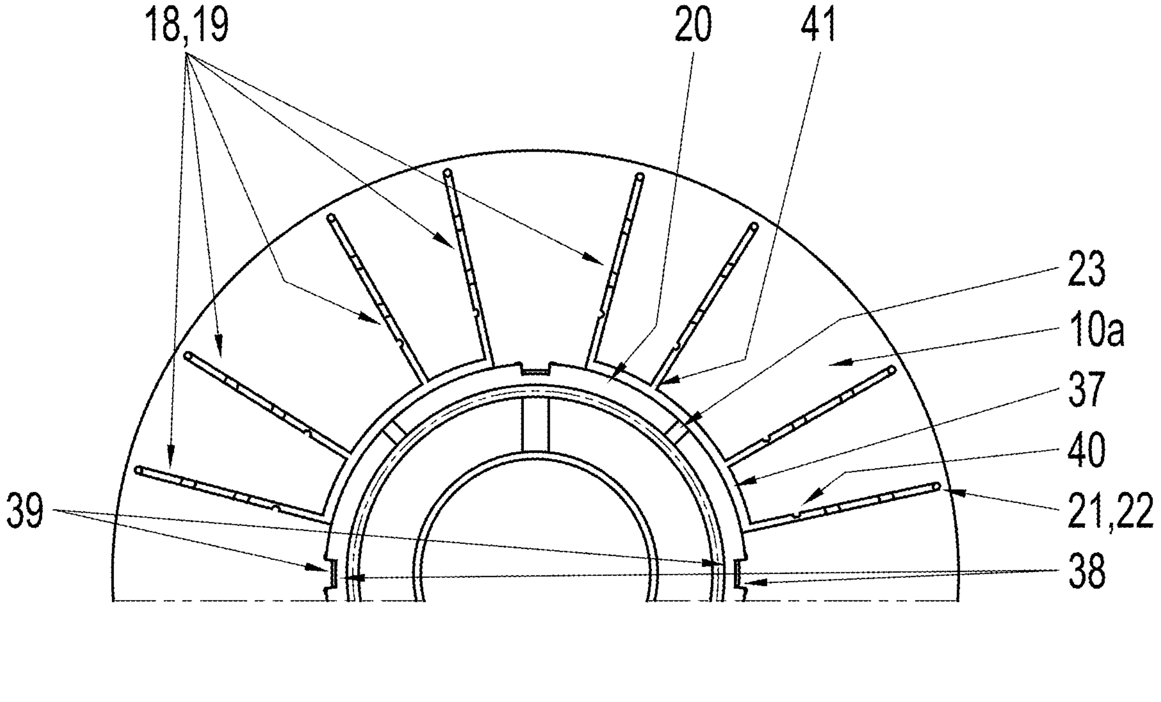
FIG. 8: Another design of an intermediate disk.

FIG. 8 shows another design of an intermediate disk 10*a*. This is made in one piece.

Furthermore, a plurality of structurally identical annular segment recesses 37 are made in the intermediate disk 10*a*, which are arranged on the rotor shaft 17 and are fluidically connected, for example, to the rotor shaft openings 23. The rotor shaft openings 23 are made around the circumference of the rotor shaft 17, for example, in the form of bores.

In this case there are four annular segment recesses 37, which extend equidistantly around the circumference. The annular segment recesses 37 are each connected to the corresponding first fluid-guiding ducts 18 and to the corresponding second fluid-guiding ducts 19, for example by way of openings 41, in order to enable the fluid to flow through to the outlets 21, 22.

The openings 41 can be distributed uniformly in the annular segment recesses 37. Moreover, in each case an equal number of first fluid-guiding ducts 18 and second fluid-guiding ducts 19 are connected, respectively, to an annular segment recess 37, which are also identically arranged.

The first fluid-guiding ducts 18 and the second fluid-guiding ducts 19 extend radially straight through the intermediate disk 10*a* and are made as recesses like the annular segment recess 37.

Furthermore, in each case there is a projection 38 between the annular segment recesses 37, which engages in a respectively corresponding recess 39 in the rotor shaft 17 and in that way centers the intermediate disk 10*a* on the rotor shaft 17. Moreover, the first fluid-guiding ducts 18 and the second fluid-guiding ducts 19 have constrictions 40, for the control of the cooling fluid flowing through. The constrictions 40 are preferably structurally identical in each of the fluid-guiding ducts 18, 19 and are made at the same level. The constrictions in this case define an aperture geometry for an adjustable volume flow.

Such an intermediate disk 10*a*, also by virtue of its integral structure, can be made with a very small width and therefore takes up little space in the arrangement as a w % bole.

Thus, the cooling fluid flows first into respective annular segment recesses 37. These distribute the cooling fluid into the first fluid-guiding ducts 18 and the second fluid-guiding ducts 19, which convey the cooling fluid to the outlets 21, 22.

Figure 9:
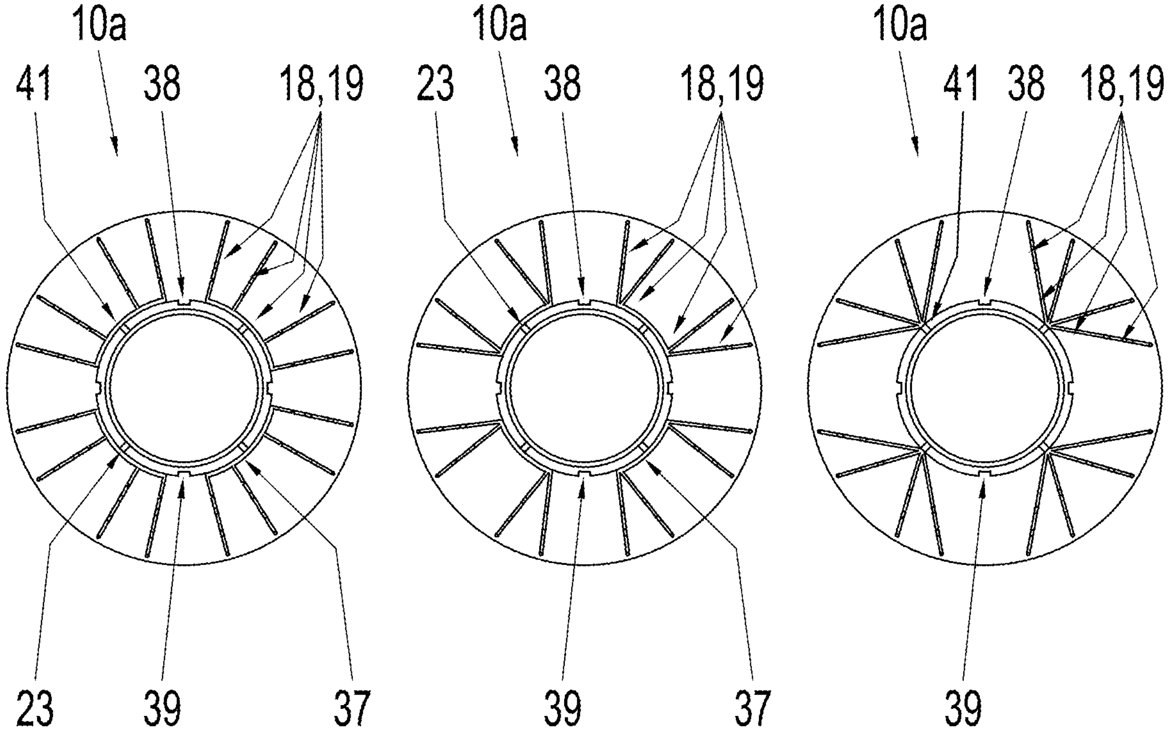
FIG. 9: The intermediate disk with variously arranged fluid-guiding ducts.

FIG. 9 shows such an intermediate disk 10*a* with variously arranged first fluid-guiding ducts 18 and second fluid-guiding ducts 19, which are in each case in the form of annular recesses in the integral intermediate disk 10 around the circumference.

In this case (on the left), respectively, one of the fluid-guiding ducts 18, 19 can be arranged at the end of an annular segment recess 37, so that in each case only one opening 41 is needed to the right and left of the rotor shaft opening 23 since at the end the cooling fluid flows into the fluid-guiding duct 18, 19 made as a recess in each case and arranged at the end. The respective opening 41 concerned is arranged equidistantly from the rotor shaft opening 23.

In the middle an integral intermediate disk 10*a* can also be seen, wherein the fluid-guiding ducts 18, 19 are in each case arranged at the end of the annular segment recess 37 so that there is no need for an opening 41. In this case the fluid-guiding ducts 18, 19 extend from the respective opening 41 obliquely through the integrally made intermediate disk 10*a*.

On the right, an integral intermediate disk 10*a* can be seen. In this case the fluid-guiding ducts 18, 19 are arranged directly at rotor shaft openings 23, so that there is no need for annular segment recesses 37. The fluid-guiding ducts 18, 19 extend obliquely through the integrally made intermediate disk 10*a*.

Figure 10:
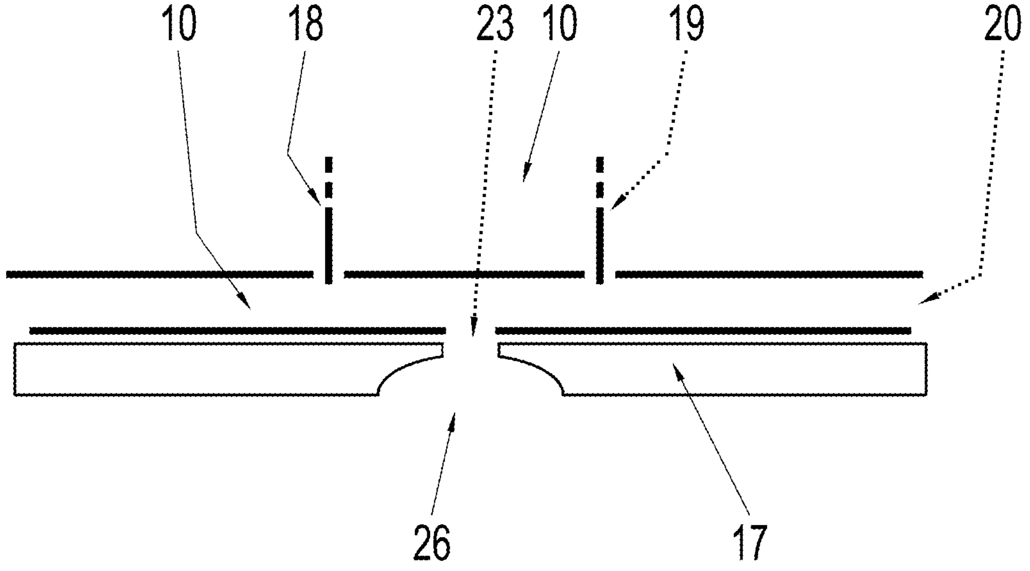
FIG. 10: A rotor arrangement in operation in a first embodiment.

FIG. 10 shows a first embodiment of a rotor arrangement 100 in operation.

In this case, oil is injected into the rotor shaft 17 for example through bores in a housing in which the electric machine is arranged. Due to centrifugal force, the oil flows along the inside of the rotor shaft 17 to rotor shaft openings 23. These are produced for example in the form of bores in the rotor shaft 17 and distributed around the circumference of the rotor shaft 17. To capture the oil flowing along around the circumference, in the rotor shaft 17 an all-round groove 26 can be provided, in which the rotor shaft openings 23 are made and in which the oil collects. In that way more oil can be conveyed to the rotor shaft openings 23.

Owing to the rotation movement of the electric machine, an outward force (centrifugal force) is exerted on the oil, which force at the same time has a conveying action whereby the oil is pressed through the rotor shaft openings 23 into the distributor ring 20 of the intermediate disk 10.

Analogously, this can also be extended to the annular segment recesses 37 and the intermediate disks 10*a*.

Alternatively, a dam 27 can be arranged, by virtue of which the oil accumulates.

Figure 11:
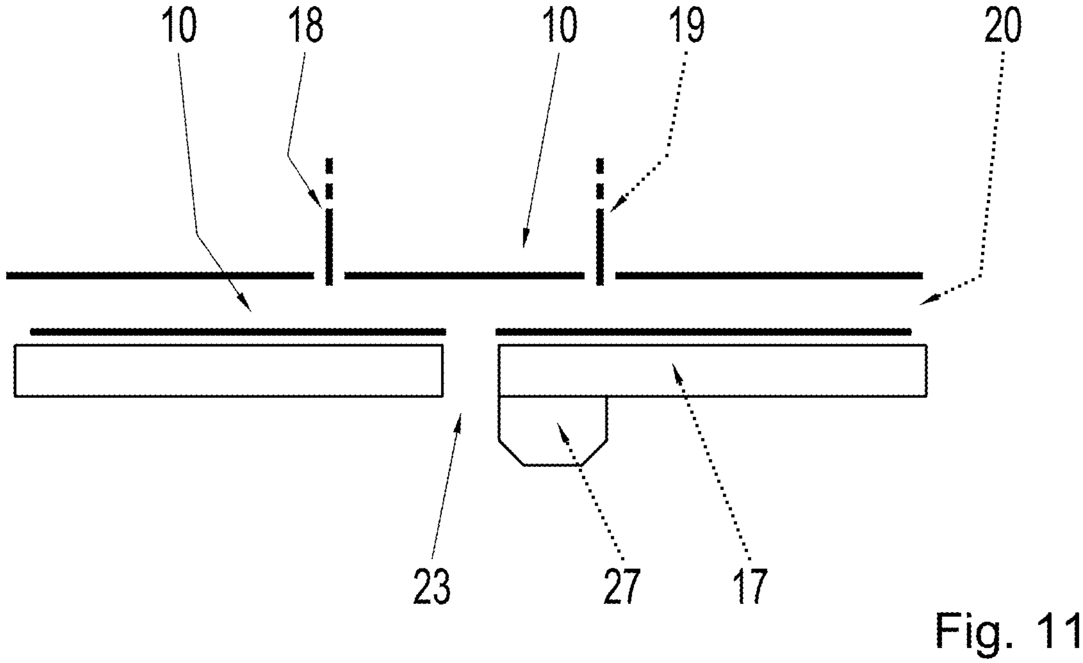
FIG. 11: An all-round dam.

FIG. 11 shows such an all-round dam 27. This is arranged next to the rotor shaft openings 23 in such manner that the cooling fluid flowing along the inside of the rotor shaft passes into the rotor shaft openings 23. The dam 27 is arranged only on one side of the rotor shaft openings 23, so that the cooling fluid flowing along the opposite side accumulates and flow into the rotor shaft openings 23. The dam 27 is arranged on the side of the rotor shaft where no cooling fluid is flowing.

Through the rotor shaft openings 23 the oil then flows into the distributor ring 20 and from there on into the fluid-guiding ducts 18, 19.

Figure 12:
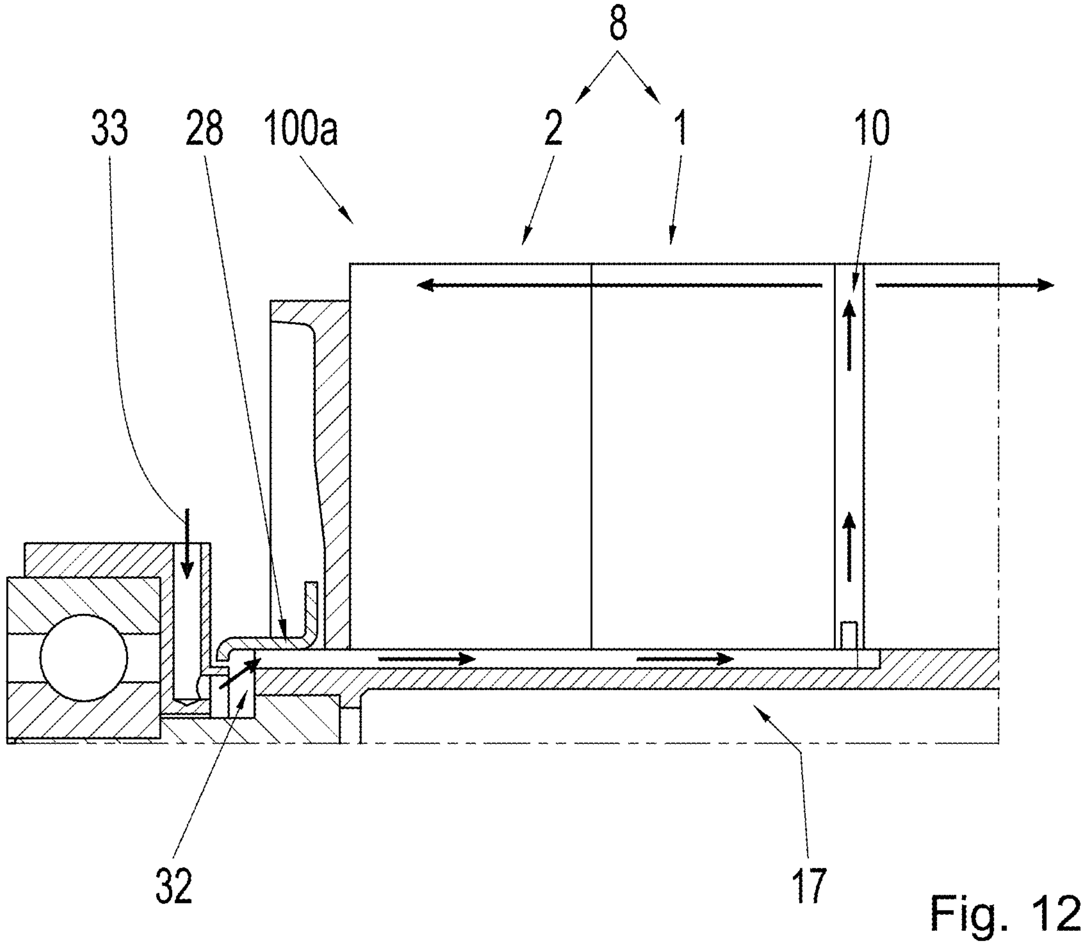
FIG. 12: A further embodiment of the rotor arrangement.

FIG. 12 shows another embodiment of the rotor arrangement 100*a*.

In this case, an all-round collecting channel 28 is arranged at the end of one of the rotor segments, in this case for example, the rotor segment 2. Thus, as it were the collecting channel 28 rotates with the rotor segments 1 2, 3, 4 and the rotor shaft 17. The collecting channel 28 is open toward the rotor axis 14.

The collecting channel 28 serves to capture a cooling fluid sprayed out by a fluid inlet 33 arranged a distance away from the corresponding end. The collecting channel 28 can capture the cooling fluid flowing away from the fluid inlet 33, as it were, like a kind of all-round gutter. Such a fluid inlet 33 can for example be a duct or tube which is arranged fixed in the housing of the electric machine. The fluid inlet 33 can for example inject the oil into the collecting channel 28 by means of pump pressure. From there, the oil can pass between the outside of the rotor shaft and the rotor core 9 to the intermediate disk 10, 10*a*.

By virtue of the collecting channel 28, the cooling oil is captured, and due to the rotation movement, a dynamic pressure of the oil is produced.

The collecting channel 28 can be connected to an axial stop of a balancing disk 32 of the rotor core 9. Through bores in the axial stop the cooling oil can flow between the rotor core 9 and the rotor shaft 17. The dynamic pressure produced ensures a conveying action.

Likewise, the intermediate disk 10 can have bores for the cooling fluid to flow in.

For controlled guiding the rotor shaft 17 can have longitudinal grooves 29 around its circumference.

Figure 13:
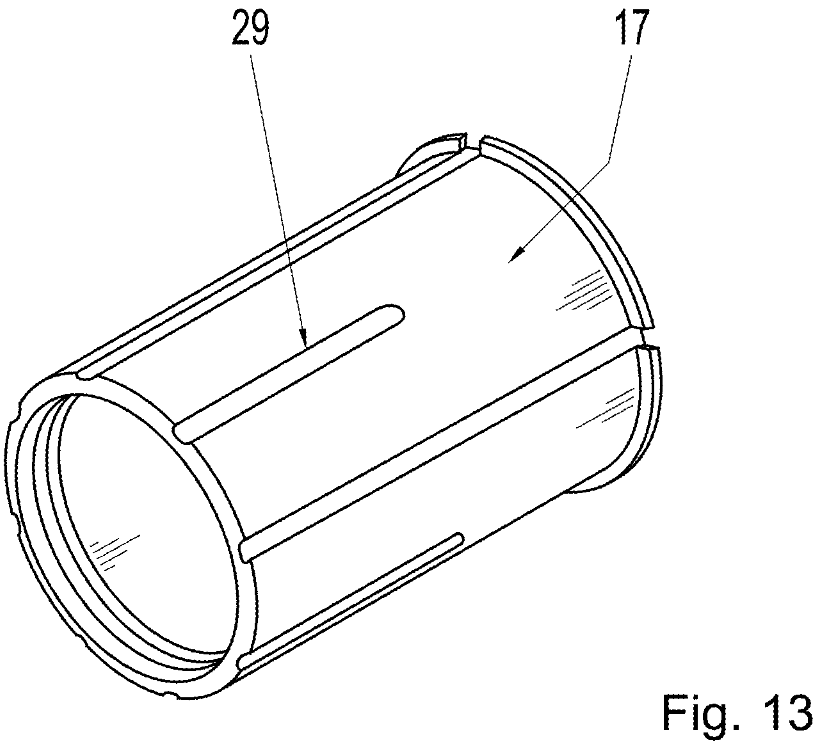
FIG. 13: A rotor shaft with longitudinal grooves.

FIG. 13 shows such longitudinal grooves on the rotor shaft 17, which are arranged distributed uniformly around the circumference. These are formed on the outside of the rotor shaft and extend at least from the collecting channel 28 to the intermediate disk 10, but for reasons of symmetry usually over the whole outside of the rotor shaft. The grooves serve to guide the captured cooling fluid from the annular collecting channel 28 to the intermediate disk 10.

Through bores, the cooling oil passes from the longitudinal grooves 29 into the distributor ring 20 of the intermediate disk 10. Analogously, this can also be extended to the annular segment recesses 37 and the intermediate disk 10*a*.

Alternatively, the rotor core 9, i.e., the rotor segments 1, 2, 3, 4 can have recess grooves 30.

Figure 14:
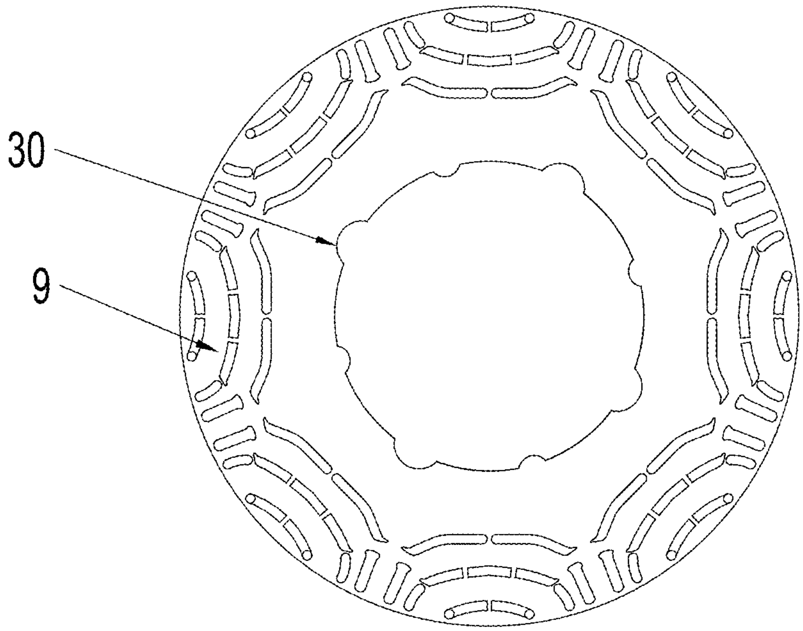
FIG. 14: A rotor core with recess grooves.

FIG. 14 shows such recess grooves 30 in the rotor core 9, which are arranged uniformly distributed radially on the inside of the rotor core 9.

In this case, the recess grooves 30 extend at least from the collecting channel 28 to the intermediate disk 10, but for reasons of symmetry, preferably extend over the whole of the rotor core 9.

In that way, the cooling fluid can pass in a controlled manner from the collecting channel 28 between the rotor core 9 and the outside of the rotor shaft to the intermediate disk 10. Through bores, the cooling oil passes from the recess grooves 30 into the distributor ring 20 of the intermediate disk 10.

Furthermore, baffles 31 can be provided.

Figure 15:
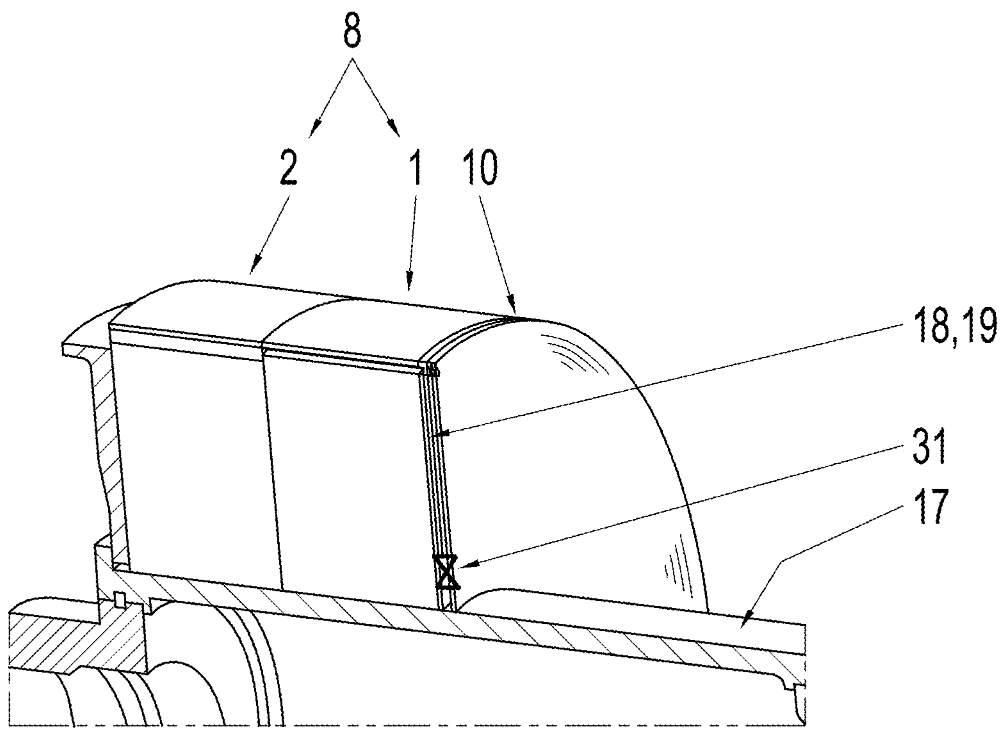
FIG. 15: Baffles in the fluid-guiding ducts.

FIG. 15 shows such baffles 31 in detail.

These can be arranged in each of the fluid-guiding ducts 18, 19 for the controlled adjustment of the through-flowing cooling fluid. Thanks to the baffles 31 controlled adjustment, for example in the form of a throttling of the through-flowing quantity of oil, can be achieved. This can prevent a pile-up of oil at the flux barriers.

In this case the baffles 31 can be in the form of sinter elements.

INDEXES

100, 100*a* Rotor arrangement
1 First rotor segment
2 Second rotor segment
3 Third rotor segment
4 Fourth rotor segment
5 Air gap
6 Stator
7 Windings
8 First rotor section
9 Rotor core
10, 10*a* Intermediate disk
11 Outer magnets
12 Middle magnets
13 Inner magnets
14 Rotor axis
15 First flux barriers
16 First Overlap zone
17 Rotor shaft
18 First fluid-guiding ducts
19 Second fluid-guiding ducts
20 Distributor ring
21 First outlets
22 Second outlets
23 Rotor shaft openings
24 First disk element
25 Second disk element
26 Catch groove
27 Dam
28 Collecting channel
29 Longitudinal grooves
30 Recess grooves
31 Baffles
32 Balancing disk
33 Fluid inlet
34 Magnet pockets
35 Laser
36 Second rotor section
37 Annular segment recess
38 Projection
39 Recesses
40 Constrictions
41 Openings

The invention claimed is:

1. A rotor arrangement for the improved cooling of a rotor, comprising a rotor core and a rotor shaft having an axial rotor axis, wherein the rotor core is arranged on the rotor shaft, wherein the rotor core comprises:

rotor laminae stacked one after another, embedded outer magnets arranged outside in the rotor core in axially extending magnet pockets;

at least four rotor segments arranged one after another, wherein at least a first rotor segment and a second rotor segment are stacked one after the other and form a first rotor section;

wherein, in an area of the outer magnets, the first rotor segment comprises axially through-going first flux barriers separate from the embedded outer magnets;

wherein, in the area of the outer magnets, the second rotor segment comprises axially through-going second flux barriers separate from the embedded outer magnets;

wherein the first rotor segment and the second rotor segment are offset at a first angle relative to one another;

wherein the first angle is chosen such that the first flux barriers and the second flux barriers overlap partially in a first overlap zone;

wherein at least a third rotor segment and a fourth rotor segment are stacked directly one after the other and form a second rotor section;

wherein, in the area of the embedded outer magnets, the fourth rotor segment comprises axially through-going fourth flux barriers separate from the embedded outer magnets;

wherein, in the area of the embedded outer magnets, the third rotor segment comprises axially through-going third flux barriers separate from the embedded outer magnets;

wherein the third rotor segment and the fourth rotor segment are offset at a second angle relative to one another;

wherein the second angle is chosen such that the third flux barriers and the fourth flux barriers overlap partially in a second overlap zone;

wherein between and adjacent to the first rotor section and the second rotor section an intermediate disk is arranged around the rotor shaft, the intermediate disk comprising a distributor ring in fluidic connection with the first fluid-guiding ducts and the second fluid-guiding ducts, the distributor ring configured for distributing the cooling fluid to the first fluid-guiding ducts and the second fluid-guiding ducts, and wherein the intermediate disk has radially extending first fluid-guiding ducts and second fluid-guiding ducts distributed around the circumference for guiding cooling fluid;

wherein by way of the rotor shaft cooling fluid can be passed into the intermediate disk;

wherein the first fluid-guiding ducts have first outlets and the second fluid-guiding ducts have second outlets to enable the cooling fluid to flow out; and wherein the first outlets are connected fluidically with the adjacent flux barriers of the first rotor section and also the second outlets are connected fluidically with the adjust flux barriers of the second rotor section to enable the cooling fluid to flow into corresponding flux barriers, so that by virtue of the first overlap through-going axial cooling of the outer magnets of the first rotor section and by virtue of the second overlap through-going axial cooling of the outer magnets of the second rotor section with cooling fluid takes place.

2. The rotor arrangement according to claim 1, wherein the first overlap zone and also the second overlap zone are arranged in the outer periphery in the respective flux barriers, in the area of a radially outer side of the rotor core.

3. The rotor arrangement according to claim 1, wherein the distributor ring is arranged on an outside of the rotor shaft.

4. The rotor arrangement according to claim 1, comprising baffles arranged in the first fluid-guiding ducts and the second fluid-guiding ducts for the controlled adjustment of the quantity of cooling fluid flowing through.

5. The rotor arrangement according to claim 1, wherein the intermediate disk is adhesively bonded to the first rotor section and the second rotor section.

6. A rotor arrangement for the improved cooling of a rotor, comprising a rotor core and a rotor shaft having an axial rotor axis, wherein the rotor core is arranged on the rotor shaft, wherein the rotor core comprises:

rotor laminae stacked one after another, embedded outer magnets arranged outside in the rotor core in axially extending magnet pockets;

at least four rotor segments arranged one after another, wherein at least a first rotor segment and a second rotor segment are stacked one after the other and form a first rotor section;

wherein, in an area of the outer magnets, the first rotor segment comprises axially through-going first flux barriers separate from the embedded outer magnets;

wherein, in the area of the outer magnets, the second rotor segment comprises axially through-going second flux barriers separate from the embedded outer magnets;

wherein the first rotor segment and the second rotor segment are offset at a first angle relative to one another;

wherein the first angle is chosen such that the first flux barriers and the second flux barriers overlap partially in a first overlap zone;

wherein at least a third rotor segment and a fourth rotor segment are stacked directly one after the other and form a second rotor section;

wherein, in the area of the embedded outer magnets, the fourth rotor segment comprises axially through-going fourth flux barriers separate from the embedded outer magnets;

wherein, in the area of the embedded outer magnets, the third rotor segment comprises axially through-going third flux barriers separate from the embedded outer magnets;

wherein the third rotor segment and the fourth rotor segment are offset at a second angle relative to one another;

wherein the second angle is chosen such that the third flux barriers and the fourth flux barriers overlap partially in a second overlap zone;

wherein between and adjacent to the first rotor section and the second rotor section an intermediate disk is arranged around the rotor shaft, wherein the intermediate disk has radially extending first fluid-guiding ducts and second fluid-guiding ducts distributed around the circumference for guiding cooling fluid;

wherein by way of the rotor shaft cooling fluid can be passed into the intermediate disk;

wherein the first fluid-guiding ducts have first outlets and the second fluid-guiding ducts have second outlets to enable the cooling fluid to flow out; and wherein the first outlets are connected fluidically with the adjacent flux barriers of the first rotor section and also the second outlets are connected fluidically with the adjust flux barriers of the second rotor section to enable the cooling fluid to flow into corresponding flux barriers, so that by virtue of the first overlap through-going axial cooling of the outer magnets of the first rotor section and by virtue of the second overlap through-going axial cooling of the outer magnets of the second rotor section with cooling fluid takes place;

wherein the intermediate disk is formed by a first disk element and a second disk element identical thereto;

wherein the first disk element has fluid-guiding ducts arranged around its circumference and the second disk element has fluid-guiding ducts identical thereto; and wherein the first disk element and the second disk element are arranged relative to one another so as to form the intermediate disk, in such manner that in the first disk element first fluid-guiding ducts comprise the first outlets and in the second disk element second fluid-guiding ducts comprise the second outlets.

7. The rotor arrangement according to claim 6, wherein the first disk element and the second disk element are welded to one another.

8. The rotor arrangement according to claim 7, wherein both the first disk element and also the second disk element are made of plastic, wherein one of the two disk elements is made of a transparent plastic, and wherein the two disk elements are joined by plastic welding along the fluid-guiding ducts.

9. The rotor arrangement according to claim 8, wherein the first disk element and the second disk element are adhesively bonded to one another.

10. A rotor arrangement for the improved cooling of a rotor, comprising a rotor core and a rotor shaft having an axial rotor axis, wherein the rotor core is arranged on the rotor shaft, wherein the rotor core comprises:

rotor laminae stacked one after another, embedded outer magnets arranged outside in the rotor core in axially extending magnet pockets;

at least four rotor segments arranged one after another, wherein at least a first rotor segment and a second rotor segment are stacked one after the other and form a first rotor section;

wherein, in an area of the outer magnets, the first rotor segment comprises axially through-going first flux barriers separate from the embedded outer magnets;

wherein, in the area of the outer magnets, the second rotor segment comprises axially through-going second flux barriers separate from the embedded outer magnets;

wherein the first rotor segment and the second rotor segment are offset at a first angle relative to one another;

wherein the first angle is chosen such that the first flux barriers and the second flux barriers overlap partially in a first overlap zone;

wherein at least a third rotor segment and a fourth rotor segment are stacked directly one after the other and form a second rotor section;

wherein, in the area of the embedded outer magnets, the fourth rotor segment comprises axially through-going fourth flux barriers separate from the embedded outer magnets;

wherein, in the area of the embedded outer magnets, the third rotor segment comprises axially through-going third flux barriers separate from the embedded outer magnets;

wherein the third rotor segment and the fourth rotor segment are offset at a second angle relative to one another;

wherein the second angle is chosen such that the third flux barriers and the fourth flux barriers overlap partially in a second overlap zone;

wherein between and adjacent to the first rotor section and the second rotor section an intermediate disk is arranged around the rotor shaft, wherein the intermediate disk has radially extending first fluid-guiding ducts and second fluid-guiding ducts distributed around the circumference for guiding cooling fluid;

wherein by way of the rotor shaft cooling fluid can be passed into the intermediate disk;

wherein the first fluid-guiding ducts have first outlets and the second fluid-guiding ducts have second outlets to enable the cooling fluid to flow out; and wherein the first outlets are connected fluidically with the adjacent flux barriers of the first rotor section and also the second outlets are connected fluidically with the adjust flux barriers of the second rotor section to enable the cooling fluid to flow into corresponding flux barriers, so that by virtue of the first overlap through-going axial cooling of the outer magnets of the first rotor section and by virtue of the second overlap through-going axial cooling of the outer magnets of the second rotor section with cooling fluid takes place;

wherein the first overlap zone and also the second overlap zone are arranged in the outer periphery in the respective flux barriers, in the area of a radially outer side of the rotor core; and wherein the intermediate disk defines a plurality of annular segment recesses, each of which is in fluidic connection with the corresponding first fluid-guiding ducts and with the corresponding second fluid-guiding ducts in order to distribute the cooling fluid by way of the annular segment recesses to the first fluid-guiding ducts and the second fluid-guiding ducts.

11. The rotor arrangement according to claim 10, wherein the first fluid-guiding ducts and the second fluid-guiding ducts are made as recesses in the intermediate disk.

12. The rotor arrangement according to claim 10, wherein the intermediate disk is made in one piece and comprises at least one projection, and the rotor shaft has a corresponding recess such that the at least one projection is arranged in the corresponding recess.

13. The rotor arrangement according to claim 10, wherein the first fluid-guiding ducts and the second fluid-guiding ducts have constrictions for the control of the through-flowing cooling fluid.

14. The rotor arrangement according to claim 10, wherein the rotor shaft has rotor shaft openings distributed around its circumference, which open into the distributor ring or into the annular segment recesses.

15. The rotor arrangement according to claim 14 wherein the rotor shaft defines an all-round catch groove facing toward the rotor axis, and the rotor shaft openings are arranged inside the catch groove.

16. The rotor arrangement according to claim 15, wherein the rotor shaft has a rotor shaft inside and comprises an all-round dam which is arranged on the rotor shaft inside facing toward the rotor axis, the dam being arranged next to the rotor shaft openings in such manner that the cooling fluid flowing along the inside of the rotor shaft flows into the rotor shaft openings.

17. The rotor arrangement according to claim 16, wherein at least on one of the rotor segments at the ends an all-round collecting channel is arranged, the collecting channel being open toward the rotor axis, in order to capture any cooling fluid that is sprayed away from a fluid inlet arranged a distance away from the corresponding end.

18. The rotor arrangement according to claim 17, wherein the rotor shaft has a rotor shaft outside and the rotor shaft outside defines longitudinal grooves distributed around its circumference, which grooves extend at least from the collecting channel to the intermediate disk in order to guide the captured cooling fluid from the annular collecting channel into the intermediate disk.

19. The rotor arrangement according to claim 17, wherein the rotor core defines recess grooves that extend at least from the collecting channel to the intermediate disk in order to guide the captured cooling fluid from the annular collecting channel into the intermediate disk.

* * * * *